(12) United States Patent
Kure et al.

(10) Patent No.: US 9,942,166 B2
(45) Date of Patent: Apr. 10, 2018

(54) RELAY MANAGEMENT APPARATUS, RELAY MANAGEMENT METHOD, PROGRAM, AND RELAY MANAGEMENT SYSTEM

(71) Applicant: SONY CORPORATION, Tokyo (JP)

(72) Inventors: Yoshinobu Kure, Kanagawa (JP); Koichi Ogasawara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 210 days.

(21) Appl. No.: 14/766,484

(22) PCT Filed: Mar. 11, 2014

(86) PCT No.: PCT/JP2014/056291
§ 371 (c)(1),
(2) Date: Aug. 7, 2015

(87) PCT Pub. No.: WO2014/162828
PCT Pub. Date: Oct. 9, 2014

(65) Prior Publication Data
US 2015/0381523 A1    Dec. 31, 2015

(30) Foreign Application Priority Data
Apr. 5, 2013    (JP) .................. 2013-079394

(51) Int. Cl.
*H04L 12/927* (2013.01)
*H04L 29/08* (2006.01)
(Continued)

(52) U.S. Cl.
CPC .......... *H04L 47/806* (2013.01); *H04L 12/185* (2013.01); *H04L 12/1886* (2013.01);
(Continued)

(58) Field of Classification Search
CPC .............................. H04W 84/18; H04W 84/12
See application file for complete search history.

(56) References Cited

U.S. PATENT DOCUMENTS 7,787,380 B1    8/2010    Aggarwal et al.
8,462,635 B1    6/2013    Aggarwal et al.
(Continued)

FOREIGN PATENT DOCUMENTS

JP    9-247199 A    9/1997
JP    2003-60696 A    2/2003
(Continued)

OTHER PUBLICATIONS

Extended European Search Report dated Oct. 7, 2016 in Patent Application No. 14779526.4.
(Continued)

*Primary Examiner* — Zhiren Qin
(74) *Attorney, Agent, or Firm* — Oblon, McClelland, Maier & Neustadt, L.L.P.

(57) ABSTRACT

Provided is a relay management apparatus including: a session management unit configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

10 Claims, 15 Drawing Sheets

(51) Int. Cl.
*H04L 12/18* (2006.01)
*H04L 29/06* (2006.01)
*H04L 12/913* (2013.01)
*H04L 12/923* (2013.01)

(52) U.S. Cl.
CPC .......... *H04L 65/4076* (2013.01); *H04L 67/14* (2013.01); *H04L 67/146* (2013.01); *H04L 47/724* (2013.01); *H04L 47/762* (2013.01)

(56) References Cited

U.S. PATENT DOCUMENTS

| | | | | |
|---|---|---|---|---|
| 8,789,124 | B1* | 7/2014 | Malaby | H04N 7/173 725/116 |
| 2003/0081559 | A1* | 5/2003 | Matuoka | H04L 12/1877 370/252 |
| 2003/0107991 | A1* | 6/2003 | Tezuka | H04L 12/6418 370/229 |
| 2003/0235187 | A1* | 12/2003 | Iwama | H04M 7/1285 370/352 |
| 2004/0042398 | A1* | 3/2004 | Peleg | H04L 47/11 370/230 |
| 2004/0139199 | A1* | 7/2004 | Ando | H04L 47/724 709/227 |
| 2004/0258066 | A1 | 12/2004 | Chen et al. | |
| 2007/0008883 | A1* | 1/2007 | Kobayashi | H04L 47/10 370/230 |
| 2007/0081459 | A1 | 4/2007 | Segel et al. | |
| 2008/0063001 | A1* | 3/2008 | Tanimoto | H04L 12/4633 370/401 |
| 2008/0158597 | A1* | 7/2008 | Hashimoto | G06F 21/608 358/1.15 |
| 2008/0198848 | A1* | 8/2008 | Yamagishi | H04N 7/17336 370/390 |
| 2008/0275953 | A1* | 11/2008 | Tanimoto | G06Q 10/107 709/205 |
| 2009/0257432 | A1* | 10/2009 | Yamaguchi | H04L 12/18 370/390 |
| 2009/0300194 | A1* | 12/2009 | Ogasawara | H04L 65/4076 709/228 |
| 2011/0106928 | A1* | 5/2011 | Gokurakuji | H04L 67/06 709/223 |
| 2011/0289230 | A1* | 11/2011 | Ueno | H04L 45/42 709/228 |
| 2013/0138822 | A1* | 5/2013 | Hu | H04L 65/1069 709/227 |

FOREIGN PATENT DOCUMENTS

| | | |
|---|---|---|
| JP | 2004-32114 A | 1/2004 |
| JP | 2006-229966 A | 8/2006 |

OTHER PUBLICATIONS

International Search Report dated Jun. 17, 2014 in PCT/JP2014/056291.

* cited by examiner

SESSION INFORMATION:
- MULTICAST ADDRESS
- DATA STREAM INFORMATION (STREAM RETENTION FOR SEVERAL MINUTES)
  - DATA RATE (bps)
  - CODEC (COMPRESSION METHOD)
  - TRANSMISSION SIDE IP ADDRESS
  - TRANSMISSION SIDE UDP PORT NUMBER
  - RECEPTION SIDE INFORMATION (RECEPTION APPARATUS RETENTION FOR SEVERAL MINUTES)
    - RECEPTION SIDE IP ADDRESS
    - RECEPTION SIDE UDP PORT NUMBER

RELAY MANAGEMENT APPARATUS, RELAY MANAGEMENT METHOD, PROGRAM, AND RELAY MANAGEMENT SYSTEM

TECHNICAL FIELD

The present disclosure relates to a relay management apparatus, a relay management method, a program, and a relay management system.

BACKGROUND ART

Recently, Internet protocol (IP) multicast transmission is sometimes used for transmitting one data stream to a plurality of reception apparatuses and for the plurality of reception apparatuses to process and display the same data stream. The following patent literature 1 may be cited as the literature describing such multicast transmission.

CITATION LIST

Patent Literature

Patent Literature 1: JP 2004-32114A

SUMMARY OF INVENTION

Technical Problem

In the multicast transmission as described above, preferably a relay link between a transmission apparatus and a reception apparatus is flexibly accommodated to the change of the transmission apparatus or the reception apparatus participating in the multicast transmission.

Solution to Problem

According to the present disclosure, there is provided a relay management apparatus including: a session management unit configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

According to the present disclosure, there is provided a relay management method including: performing registration of session information for multicast transmission of a data stream that is performed between one or two or more transmission apparatuses and one or two or more reception apparatuses via relay links of a relay apparatus, separately for information on a transmission apparatus side and information on a reception apparatus side; and performing band reservation of a relay link on the transmission apparatus side or band reservation of a relay link on the reception apparatus side, based on the registration of the session information on the transmission apparatus side or the reception apparatus side.

According to the present disclosure, there is provided a program causing a computer to function as: a session management unit configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

According to the present disclosure, there is provided a relay management system including: one or two or more transmission apparatuses; one or two or more reception apparatuses; one or two or more relay apparatuses forming relay links between the one or two or more transmission apparatuses and the one or two or more reception apparatuses; and a relay management apparatus including, a session management unit configured to perform registration of session information for multicast transmission of a data stream that is performed via the relay links, separately for information on a transmission apparatus side and information on a reception apparatus side, and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

Advantageous Effects of Invention

As described above, according to the present disclosure, the relay link between the transmission apparatus and the reception apparatus can be flexibly accommodated to the change of the transmission apparatus or the reception apparatus participating in the multicast transmission.

DESCRIPTION OF EMBODIMENTS

Figure 1:
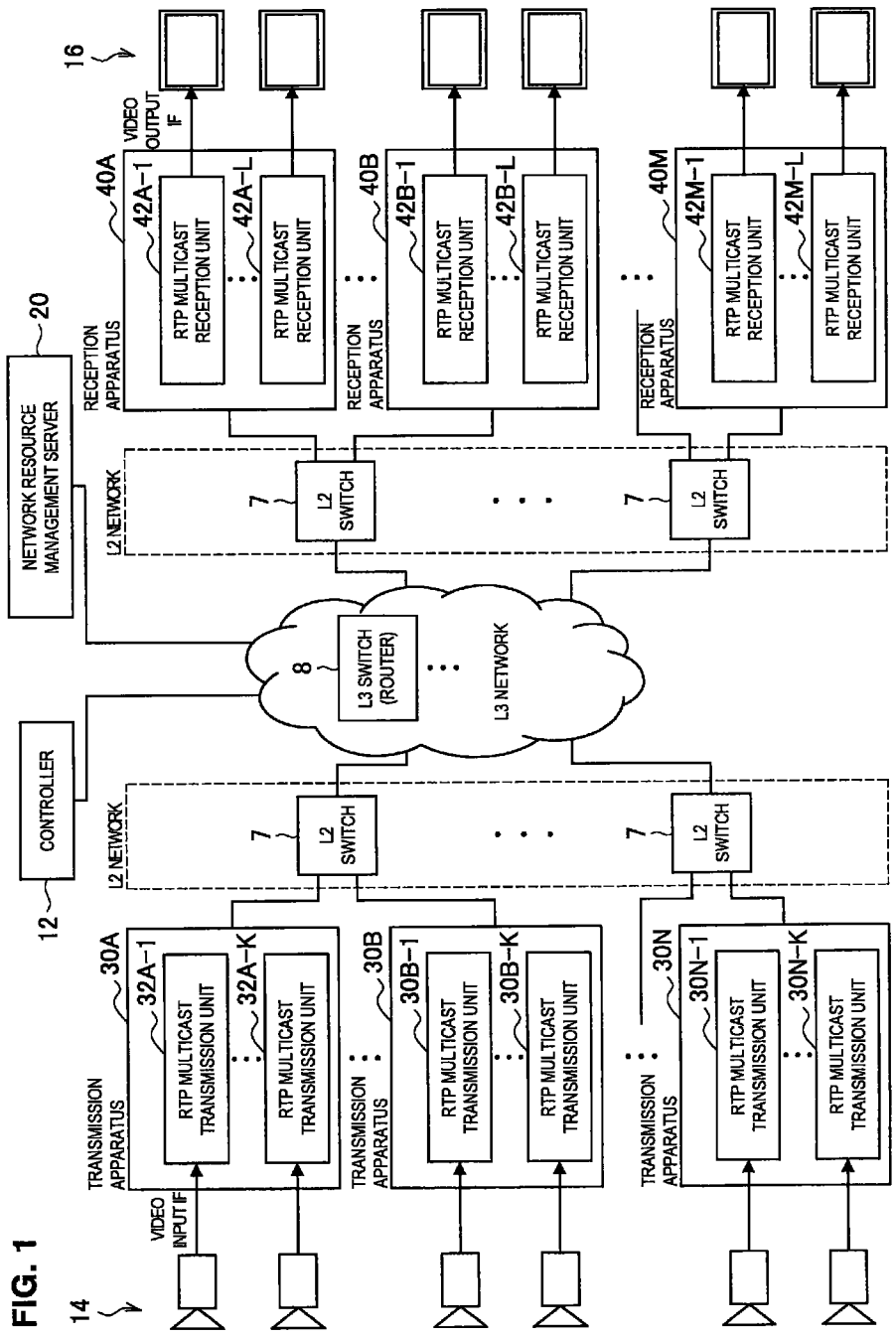
FIG. 1 is an explanatory diagram illustrating an entire configuration of a relay management system according to an embodiment of the present disclosure.

Hereinafter, a preferred embodiment of the present disclosure will be described in detail with reference to the appended drawings. Note that, in this specification and the drawings, elements that have substantially the same function and structure are denoted with the same reference signs, and repeated explanation is omitted.

Further, in the present specification and the drawings, sometimes a plurality of elements that has substantially the same function and structure is distinguished by different alphabets attached after the same reference signs. For example, a plurality of elements that has substantially the same function and structure or logical meaning is distinguished as needed as transmission apparatuses 30A, 30B, and 30C. Note that, when the plurality of elements that has substantially the same function and structure does not have to be distinguished individually in particular, only the same reference sign is attached. For example, when the transmission apparatuses 30A, 30B, and 30C do not have to be distinguished in particular, each of these apparatuses is simply called a transmission apparatus 30.

Further, the present disclosure will be explained in the order of the following items.

1. Entire configuration of a relay management system
2. Configuration of a network resource management server
3. Operation of a relay management system
3-1. Operation in successful registration
3-2. Operation in unsuccessful registration
3-3. Operation in registration deletion
4. Variation example
5. Hardware configuration
6. Conclusion

1. Entire Configuration of a Relay Management System

A technique according to the present disclosure can be realized in various modes as will be explained in "2. Configuration of a network resource management server" to "5. Hardware configuration" in detail, as an example. Further, the network resource management server (relay management apparatus) in an embodiment includes:

A. a session management unit (240) configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and B. a band reservation unit (resource management unit 250) configured to perform band reservation of a relay link on the transmission apparatus side or band reservation of a relay link on the reception apparatus side, based on the registration of the session information on the transmission apparatus side or the reception apparatus side by the session management unit.

In the following, first an entire configuration of a relay management system including the network resource management server like this will be explained with reference to FIG. 1 and FIG. 2.

FIG. 1 is an explanatory diagram illustrating an entire configuration of the relay management system according to the embodiment of the present disclosure. As illustrated in FIG. 1, the relay management system according to the embodiment of the present disclosure includes a controller 12, a plurality of imaging apparatuses 14, a plurality of display apparatuses 16, a network resource management server 20, transmission apparatuses 30A to 30N, reception apparatuses 40A to 40M, a plurality of L2 switches 7, and a plurality of L3 switches 8, and performs multicast transmission from the N transmission apparatuses 30 to the M reception apparatuses 40.

Each of the transmission apparatuses 30 includes at least one real-time transport protocol (RTP) multicast transmission unit 32. The RTP multicast transmission unit 32 inputs a video/voice data stream from the imaging apparatus 14 via a video input IF, for example, and the RTP multicast transmission unit 32 multicast-transmits the input data stream. Each of the transmission apparatuses 30 also can multicast-transmit a plurality of data streams from the plurality of RTP multicast transmission units 32.

Each of the reception apparatuses 40 includes at least one RTP multicast reception unit 42. The RTP multicast reception unit 42 receives the data stream which is multicast-transmitted from the transmission apparatus 30 and relayed by an L2 network and an L3 network. The data stream received by the RTP multicast reception unit 42 is output to the display apparatus 16 via a video output IF to be displayed on the display apparatus 16, for example. Each of the reception apparatuses 40 also can receive the plurality of data streams multicast-transmitted, by the plurality of RTP multicast reception units 42.

The L2 switch 7 relays data transmission between the transmission apparatus 30 or the reception apparatus 40 and the L3 network. The L3 switch 8 relays data transmission between the L2 network on the transmission apparatus 30 side and an L2 network on the reception apparatus 40 side. Note that, in the present specification, sometimes the L2 switch 7 and the L3 switch 8 are collectively called a relay apparatus 10.

The controller 12 transmits an instruction about the multicast transmission in the relay management system to the network resource management server 20. For example, the controller 12, when a transmission apparatus 30 or a reception apparatus 40 to participate in the multicast transmission is specified by operator's operation, transmits information of the specified transmission apparatus 30 or the reception apparatus 40 to the network resource management server 20.

The network resource management server 20 performs setting management of each of the relay apparatuses in the L2 network and the L3 network, band reservation for a data stream to be multicast-transmitted, and the like according to the instruction from the controller 12. The function and operation of this network resource management server 20 will be explained in detail in "2. Configuration of a network resource management server" and the following part.

As above, with reference to FIG. 1, the entire configuration of the relay management system according to the embodiment of the present disclosure has been explained. Subsequently, with reference to FIG. 2, communication performed between the elements in the relay management system will be summarized.

Figure 2:
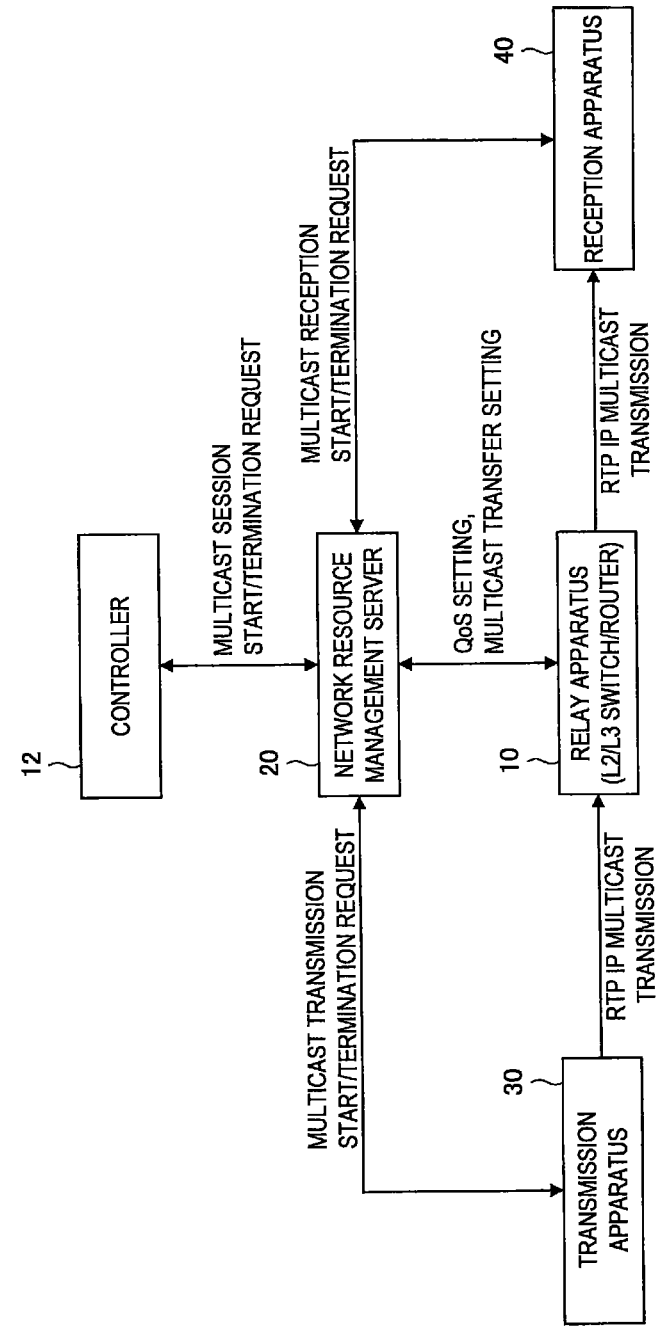
FIG. 2 is an explanatory diagram illustrating communication performed between elements in a relay management system.

FIG. 2 is an explanatory diagram illustrating communication performed between the elements in the relay management system. The controller 12 and the network resource management server 20 are connected by a hyper text transfer protocol (HTTP) session, for example, and a "multicast session start/termination request" is transmitted from the controller 12 to the network resource management server 20.

Further, the network resource management server 20 and the transmission apparatus 30, and also the network resource management server 20 and the reception apparatus 40 are connected by WebSocket according to RFC6455, for example. The network resource management server 20 transmits a "multicast transmission start/termination request" or a "multicast reception start/termination request" based on the "multicast session start/termination request" from the controller 12.

The network resource management server 20 and the relay apparatus 10 are connected by a setting change IF such as the command line interface (CLI) via the ssh, telnet session, NETCONF according to RFC6241, and the Open-Flow protocol proposed by the Open Networking Foundation, for example. The network resource management server 20 performs Qos setting, multicast transfer, and the like to be described below on the relay apparatus 10.

The transmission apparatus 30 and the reception apparatus 40 perform the multicast transmission of the data steam (video, voice, or the like) using the RTP of the IP multicast according to RFC 3550, based on reception of "multicast transmission start/termination request" or "multicast reception start/termination request" from the network resource management server 20.

(Background)

Meanwhile, the general-purpose L2 switch analyzes an Internet Group Management Protocol (IGMP)/Multicast Listener Discovery (MLD)_JOIN/LEAVE message, which is transmitted from the reception apparatus to the L2 switch, by the IGMP/MLD snooping function, and changes the valid/invalid of multicast transfer for the corresponding port.

Further, when band management is performed in normal unicast transmission, a transmission band for each flow in each link is preliminarily calculated and the limitation of flow amount for each flow is performed at an ingress port of the L2 switch, and thereby it is possible to suppress the influence to other traffic. In the case of the multicast transmission, however, it is impossible to perform the limitation of flow amount for each flow on an egress port with the general-purpose L2 switch, but only the limitation of a transmission rate for the limited number (normally approximately eight) of output queues for each class can be performed. Accordingly, when the general-purpose L2 switch receives an IGMP/MLD_JOIN message of a flow without band reservation, the multicast transmission to the corresponding port is started, and thereby the other traffic having band reservation is affected. That is, it is difficult to perform the band management appropriately in the network using the general-purpose L2 switch.

While, for this point, a relay apparatus complying with the multi protocol label switching (MPLS) and the resource reservation protocol traffic engineering (RSVP-TE) according to IETF RFC3209 may be used, the use of such a relay apparatus may increase cost. Similarly, while, in the Open IPTV Forum, a band reservation method in the IP multicast for Internet broadcasting is described, it is necessary to prepare an apparatus complying with a gateway function such as the resource control enforcement function (RCEF) as a relay apparatus called an access node, which increases cost.

Further, when an IGMP/MLD_Leave message is transmitted from the reception apparatus in the termination of the multicast reception, a relay apparatus having received the message transmits an IGMP/MLD Query message to the reception port. Then, the relay apparatus, after confirming that an IGMP/MLD message has not been received from the reception port for a certain time, determines the multicast port transfer to be invalid. Accordingly, it takes a certain time to perform the change of valid and invalid setting in the multicast port transfer. As a result, the necessary time for display switch or the like caused by change of the band reservation or switch of reception multicast data in the reception apparatus becomes longer.

For this point, in the case that setting of IGMP/MLD Immediate Leave of the L2 switch is valid, the L2 switch determines the multicast port transfer to be invalid immediately after having received the IGMP/MLD_Leave message. When the connection port is connected with the L2 switches in multi stages and connected with a plurality of reception apparatuses, if any of the reception apparatuses transmits the IGMP/MLD_Leave message for terminating the multicast reception, the multicast transmission is terminated also for the other reception apparatuses.

Accordingly, the embodiment of the present disclosure has been created in view of the above situation. According to the embodiment of the present disclosure, it is possible to realize the band management of the multicast transmission also in a system using a general-purpose relay apparatus. Further, according to the embodiment of the present disclosure, it is possible to improve the quickness of the change in the valid/invalid setting for the multicast port transfer of a relay apparatus. In the following, a configuration and operation in the embodiment of the present disclosure like this will be explained.

2. Configuration of a Network Resource Management Server

Figure 3:
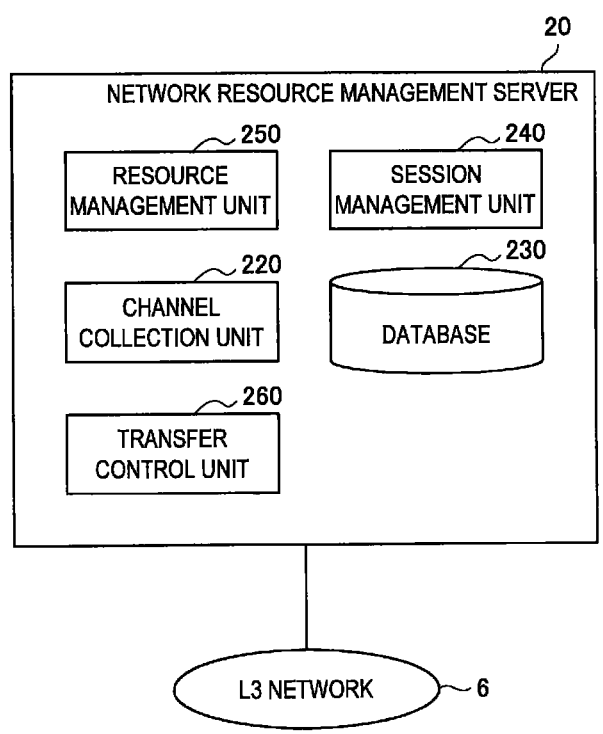
FIG. 3 is a functional block diagram illustrating a configuration of a network resource management server according to an embodiment of the present disclosure.

FIG. 3 is a functional block diagram illustrating a configuration of the network resource management server 20 according to the embodiment of the present disclosure. As illustrated in FIG. 3, the network resource management server 20 according to the present embodiment includes a channel collection unit 220, a database 230, a session management unit 240, a resource management unit 250, and a transfer control unit 260.

The channel collection unit 220 collects physical topology (device connection) information of the L2 network and the L3 network, link information such as a band width of each of the relay links, and the like. For example, the channel collection unit 220 collects multicast channel information as described above based on the link layer discovery protocol (LLDP) which is standardized by IEEE 802.1ab.

The database 230 includes various kinds of data used by the network resource management server 20. For example, the database 230 stores the information collected by the channel collection unit 220, session information registered by the session management unit 240 to be described below, and the like.

The session management unit 240 performs registration and deletion management of session information for the multicast transmission of a data stream, according to an instruction from the controller 12. Here, the session management unit 240 according to the present embodiment separately registers or deletes the session information on the side of the transmission apparatus 30 and the session information on the side of the reception apparatus 40. With such a configuration, it becomes possible to flexibly handle the change of the transmission apparatus or the reception apparatus which participate in the multicast transmission. Note that the session information, while details will be explained with reference to FIG. 6, includes a group of a plurality of data streams (RTP multicast stream or the like), and the information of the transmission apparatus 30 and the reception apparatus 40.

The resource management unit 250 performs band reservation of a relay link on the side of the transmission apparatus 30 and band reservation of a link on the side of the reception apparatus 40 based on the registration of the session information on the side of the transmission apparatus 30 or the side of the reception apparatus 40 by the session management unit 240. The resource management unit 250 determines whether or not the band reservation is possible, based on whether or not the total value of a data rate of multicast transmission already reserved to use in a relay link of a reservation target and a data rate of a data stream to be newly reserved exceeds an upper-limit data rate. This band management by the resource management unit 250 will be explained in more detail with reference to FIG. 4 and the following drawings.

The transfer control unit 260 controls the Qos setting and the transfer setting in each of the relay apparatuses 10. These Qos setting and the transfer setting by the transfer control unit 260 are performed in initial setting before the registration of the session information, in the registration of the session information, in registration deletion of the session information, and the like. The Qos setting and the transfer setting performed in each of the stages will be explained in more detail with reference to FIG. 4 and the following drawings.

3. Operation of a Relay Management System

As above, the configuration of the network resource management server 20 according to the embodiment of the present disclosure has been explained. Subsequently, operation of the relay system according to the embodiment of the present disclosure will be explained.

(3-1. Operation in Successful Registration)

Figure 4:
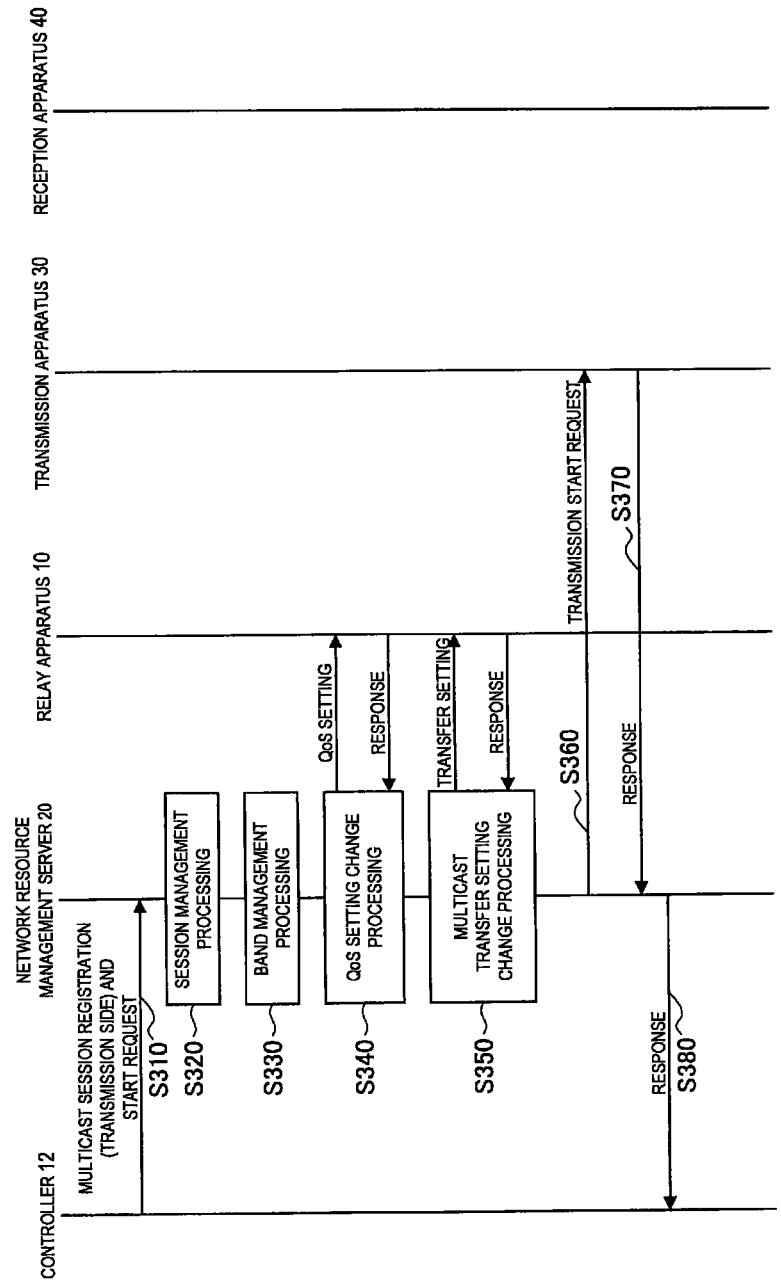
FIG. 4 is a sequence diagram illustrating a successful example of session registration on a transmission apparatus side.

FIG. 4 is a sequence diagram illustrating a successful example of the session registration on the side of the transmission apparatus 30. As illustrated in FIG. 4, when first the controller 12 transmits a request of the multi-session registration and start on the side of the transmission apparatus 30 to the network resource management server 20 (S310), the network resource management server 20 sequentially performs session management processing (S320), band management processing (S330), Qos change processing (S340), and multicast transfer setting change processing (S350). After that, the network resource management server 20 transmits a transmission start request to the transmission apparatus 30 (S360), and transfers a response from the transmission apparatus 30 to the controller 12 (S370 and S380).

Figure 5:
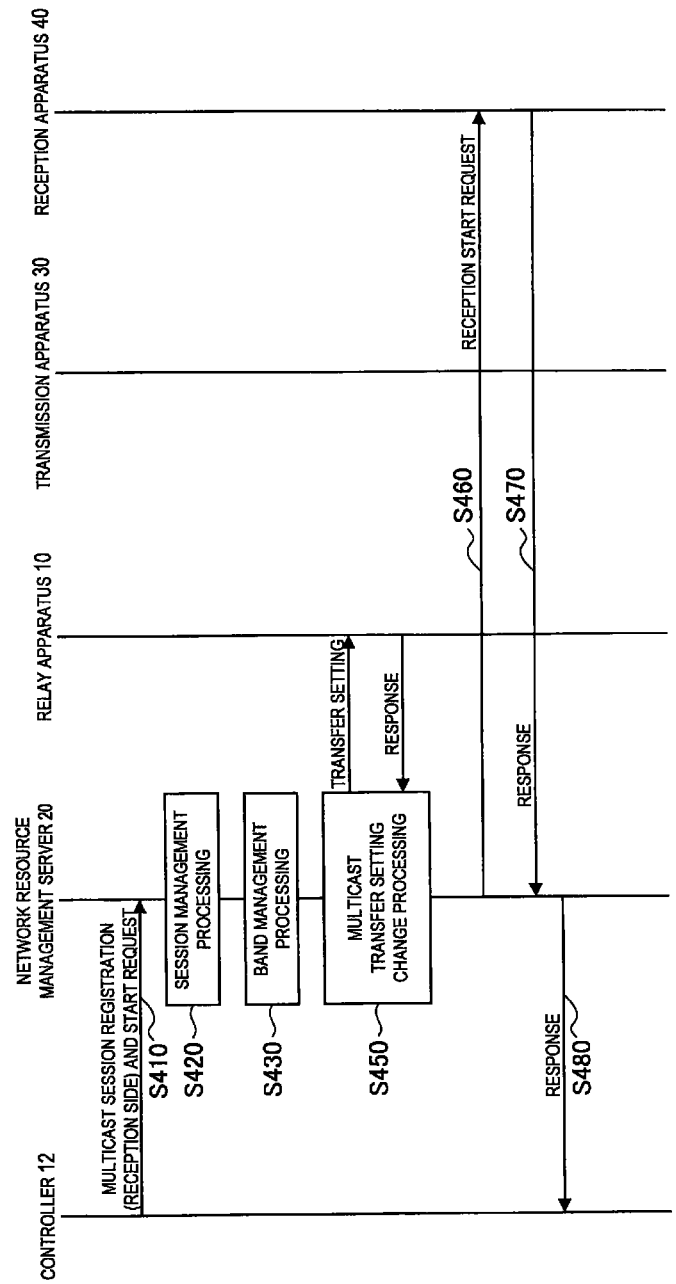
FIG. 5 is a sequence diagram illustrating a successful example of session registration on a reception apparatus side.

FIG. 5 is a sequence diagram illustrating a successful example of the session registration on the side of the reception apparatus 40. As illustrated in FIG. 5, when first the controller 12 transmits a request of the multi-session registration and start on the side of the reception apparatus 40 to the network resource management server 20 (S410), the network resource management server 20 sequentially performs the session management processing (S420), the band management processing (S430), and the multicast transfer setting change processing (S450). After that, the network resource management server 20 transmits a reception start request to the reception apparatus 40 (S460), and transfers a response from the reception apparatus 40 to the controller 12 (S470 and S480).

In the following, the session management processing (S320 and S420), the band management processing (S330 and S430), the Qos change processing (S340), and the multicast transfer setting change processing (S350 and S450) will be sequentially explained in detail.

Session Management Processing (S320 and S420):

The session management unit 240 registers the session information on the side of the transmission apparatus 30 and the session information on the side of the reception apparatus 40 separately according to the instruction from the controller 12. Here, a specific example of the session information will be explained with reference to FIG. 6.

Figure 6:
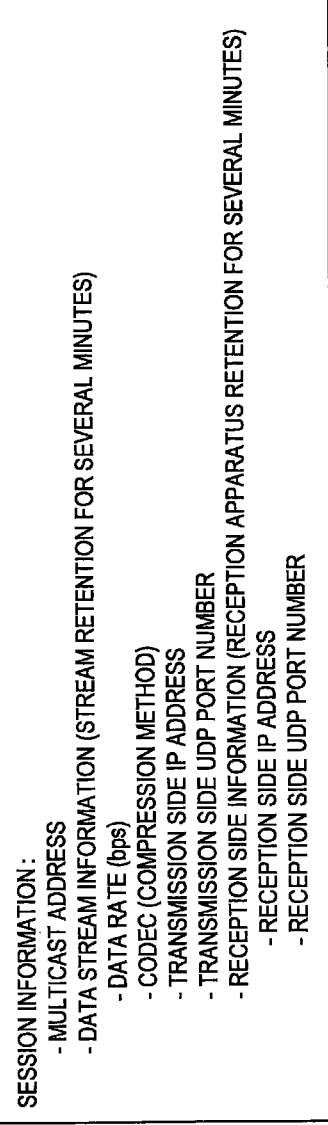
FIG. 6 is an explanatory diagram illustrating a specific example of session information.

FIG. 6 is an explanatory diagram illustrating a specific example of the session information. As illustrated in FIG. 6, the session information includes a multicast address and data stream information corresponding to the number of data streams. The data stream information includes a data rate, codec, transmission side information (transmission side IP address, transmission side UDP port number, and the like) which is the information on the side of the transmission apparatus 30, and reception side information (reception side IP address, reception side UDP port number, and the like) corresponding to the number of the reception apparatus 40 which is the information on the side of the reception apparatus 40.

In the session management processing (S320) on the side of the transmission apparatus 30, the above session information except the reception side information is registered, and the reception side information is added in each session management processing (S420) on the side of the reception apparatus 40.

Band Management Processing (S330 and S430):

The resource management unit 250 determines for each of the relay links included in the transmission channel whether or not it is possible to perform the band reservation corresponding to a data rate of a data stream for a session to be newly registered. In the band management processing (S330) in the session registration on the side of the transmission apparatus 30, the band reservation is performed to a relay link on the side of the transmission apparatus 30 for transmission performed in a state without the reception apparatus 40 participating in the multicast transmission, and the band reservation for a relay link on the side of the reception apparatus 40 is added in the band management processing (S430) in the session registration on the side of the reception apparatus 40. This point will be explained specifically with reference to FIG. 7.

Figure 7:
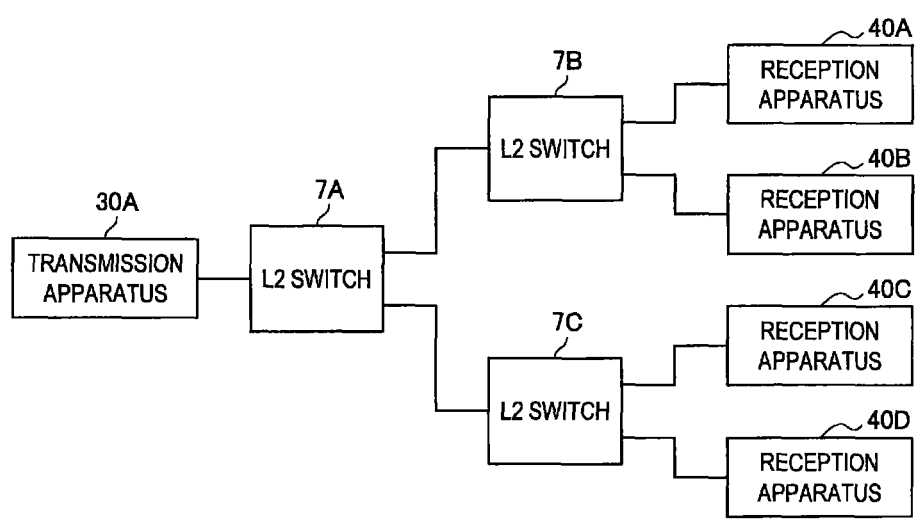
FIG. 7 is a simplified system configuration diagram for explaining a specific example of band reservation.

FIG. 7 is a simplified system configuration diagram illustrating a specific example of the band reservation. In FIG. 7, considered is a case that the reception apparatuses 40A to 40D receive a data stream multicast-transmitted by the transmission apparatus 30. In this case, in the session registration of the transmission apparatus 30, only the band reservation of a relay link from the transmission apparatus 30A to an L2 switch 7A is performed, and, in the session registration of the reception apparatus 40A, the band reservation is performed for a relay link from the L2 switch 7A to an L2 switch 7B, and from the L2 switch 7B to the reception apparatus 40A.

Then, in the session registration of the reception apparatus 40B, the band reservation is performed for a relay link from the L2 switch 7B to the reception apparatus 40B. Note that the band reservation from the L2 switch 7A to the L2 switch 7B is not performed in the session registration of the reception apparatus 40B, because this band reservation has been performed in the session registration of the reception apparatus 40A. Similarly, in the session registration of the reception apparatus 40C, the band reservation is performed for a relay link from the L2 switch 7A to an L2 switch 7C and from the L2 switch 7C to the reception apparatus 40C, and, in the session registration of the reception apparatus 40D, the band reservation is performed for a relay link from the L2 switch 7C to the reception apparatus 40D.

Note that the determination of the band reservation is performed on a band in a relay link in the transmission direction of the data stream, and the determination of the band reservation in the opposite direction is performed separately.

Subsequently, a determination method of the band reservation for each of the relay links will be explained specifically. The resource management unit 250 determines whether or not a link band width $B\_link(l)$ (bps) of a relay link l in a transmission channel of session s is not smaller than the total value of a data rate $B\_stream(d)$ (bps) of the multicast transmission which is already reserved to use in the relay link l and a data rate $B\_stream(d\_new)$ of a data stream to be newly reserved. That is, the resource management unit 250 determines whether or not following formula 1 is satisfied, in the session registration on the side of the transmission apparatus 30, and determines whether or not following formula 2 is satisfied, in the session registration on the side of the reception apparatus 40.

$$B_{link(l)} \geq \Sigma_{dersv_1} B_{stream(d)} + B_{stream(d\_new)} \text{ (for } \forall l \in \text{route\_snd}(s)) \quad \text{(Formula 1)}$$

(route_snd(s): a link group for transmission in the session registration of session s on the side of the transmission apparatus 30)

$$B_{link(l)} \geq \Sigma d_{\Sigma rsv_1} B_{stream(d)} + B_{stream(d\_new)} \text{ (for } \forall 1 \Sigma \text{route\_rcv}(s,r)) \quad \text{(Formula 2)}$$

(route_rcv(s, r): a link group which starts transmission in the reception side session registration of session s after reception participation of the reception apparatus 40r)

Note that the link band width $B\_link(l)$ (bps) in formula 1 and formula 2 may be replaced by a session reservation band width $B\_rsv\_link(l)$ (bps). For example, when data except a stream for which the session registration is performed (e.g., control signal packet) is defined to be a top priority class and 10% of the link band width is allocated to the top priority class, $B\_rsv\_link(l)=B\_link(l)\times 0.9$ is obtained.

Qos Change Processing (S340):

The transfer control unit 260 performs Qos setting processing in the relay apparatus 10 such as the L2 switch 7 and the L3 switch 8 for Qos guaranty of the band reservation for each of the sessions. Specifically, the transfer control unit 260 performs Qos setting processing which will be explained as initial setting below, for all the relay apparatuses 10 on a network under management when the network is started to be used, and performs Qos setting processing which will be explained as setting in the session registration below, in the session registration on the side of the transmission apparatus 30. With such a configuration, it becomes possible to perform the band reservation for the multicast transmission of the registered session, while securing a certain band width for top priority traffic such as a control packet. Further, also when using a relay apparatus 10 which cannot perform limitation of flow amount for each flow in output port setting, it becomes possible to perform the Qos guaranty by the band reservation.

Initial setting: (setting for all the relay apparatuses 10 on a network under management) The transfer control unit 260 performs the following setting as egress port setting of the relay apparatus 10.

Output Queue Setting:

An output queue is provided according to a DiffServ-CodePoint (DSCP) value of the following packet and priority transmission setting is performed. Scheduling is performed so as to preferentially transmit EF, AF11, and BE in this order.

DSCP value: EF . . . Top priority class (for a control packet)

DSCP value: AF11 . . . Priority class (for multicast session data)

DSCP value: BE (BestEffort) . . . Best effort class (for other data)

Output Queue Transmission Rate Setting:

The following setting is performed. Note that, when data does not exist in a queue having priority to the corresponding class queue, it is possible to exceed the transmission rate set for the corresponding class queue.

EF class queue;; 10% of a link band width

AF11 class queue;; 90% of a link band width (in this case, $B\_rsv\_link(l)=B\_link(l)\times 0.9$)

BE class queue: 5% of a link band width

Ingress Port Setting (for Only a Trunk Port)

The following setting is performed on a trunk port (port connected to another relay apparatus).

Class classification setting: Setting is performed so as to map an arrival packet to the corresponding output queue according to the DSCP value.

Setting in the session registration on the transmission apparatus side: (setting for the port of a relay apparatus 10 connected to the transmission apparatus 30 in the registered session)

Ingress Port Setting (for an Access Port of a Relay Apparatus Connected to the Transmission Apparatus in the Registered Session):

Flow amount limit setting for each flow:

Flow amount limitation is performed on a data stream (flow) included in the registered session. Flow identification is performed by the use of a transmission source IP address, a multicast address, and a transmission destination UDP port.

A flow amount limit rate is set to a data rate of a data stream included in the session information.

Class classification setting for each flow:

Class classification is performed on a data stream (flow) included in the registered session.

Class classification: AF11

Note that, while the Qos change processing is not described as processing in the session registration on the reception side in FIG. 5, when a relay apparatus 10 capable of limiting an output flow amount for each flow exists on a network under the management of the network resource management server 20, the transfer control unit 260 may perform setting of output limit for each flow as the Qos change processing in the relay apparatus 10.

Multicast Transfer Setting Change Processing (S350 and S450):

By the above Qos change processing, it is possible to realize band securing for a data stream having a DSCP value indicating the data class of "AF11", and band securing for top priority data such as the control packet having a DSCP value of "EF". On the other side, only by the Qos change processing, when the relay apparatus 10 receives the IGMP/MLD_JOIN message from the reception apparatus 40, the multicast transmission to the reception apparatus 40 is started. Accordingly, it is concerned that a band for the multicast transmission for which a band has been reserved so far might be suppressed. The multicast transfer setting change processing is processing to be performed in view of such a situation. Specifically, the transfer control unit 260 performs the transfer setting change processing which will be explained in the following as initial setting, on all the relay apparatuses 10 on the network under the management when the network is started to be used, and performs the transfer setting change processing which will be explained in the following as setting in the session registration, in the session registration on the side of the transmission apparatus 30 and on the side of the reception apparatus 40.

Initial setting: (Setting for all the relay apparatuses 10 on a network under management)

Ingress Port Setting:

IGMP/MLD_Traffic_Filter setting: An IGMP/MLD message is set so as not to be received. That is, the transfer control unit 260 sets the relay apparatus 10 into a limit mode in which the reception of a request for participation to the multicast group is limited. Thereby, it becomes possible to suppress multicast transmission of a flow except a flow reserved by the IGMP/MLD Join Message.

Setting in the session registration: (Setting for the output port of a transmission side relay apparatus in a relay link for which a band is reserved by the "band management processing", in the session registration)

Transfer Start Setting

Transfer start setting is performed for a data stream (flow) included in the registered session. With such a configuration, the relay apparatus 10 can start the transfer of the data stream included in the registered session. When the relay apparatus 10 is the L2 switch 7, the transfer start setting is realized by IGMP/MLD_Static_Snooping setting, for example. On the other side, when the relay apparatus 10 is the L3 switch 8, the above initial setting and the transfer start setting are realized by change of multicast routing protocol setting (PIM-SSM or the like), static setting of a multicast routing table, unicast routing setting (OSPF, Static route, or the like), traffic filter setting, or the like.

By the combination of the above initial setting and setting in the session registration, only the data stream of the registered session is transferred on the network as a data stream to be multicast-transmitted, and thereby it is possible to realize the band management of the multicast transmission.

Note that, while FIG. 4 illustrates the example that the multicast transfer setting change processing is performed also in the session registration on the side of the transmission apparatus 30, when a relay apparatus 10 to start the transfer of the data stream does not exists by the session registration on the side of the transmission apparatus 30, the multicast transfer setting change processing is not performed. For example, as illustrated in FIG. 7, when only the band reservation for a relay link from the transmission apparatus 30A to the L2 switch 7A is performed in the session registration of the transmission apparatus 30A, the L2 switch 7A does not perform the transfer of the data stream, therefore the multicast transfer setting change processing is not necessary.

(3-2. Operation in Unsuccessful Registration)

As above, the operation in the successful session registration has been explained. Subsequently, operation in unsuccessful registration will be explained with reference to FIG. 8 and FIG. 9.

Figure 8:
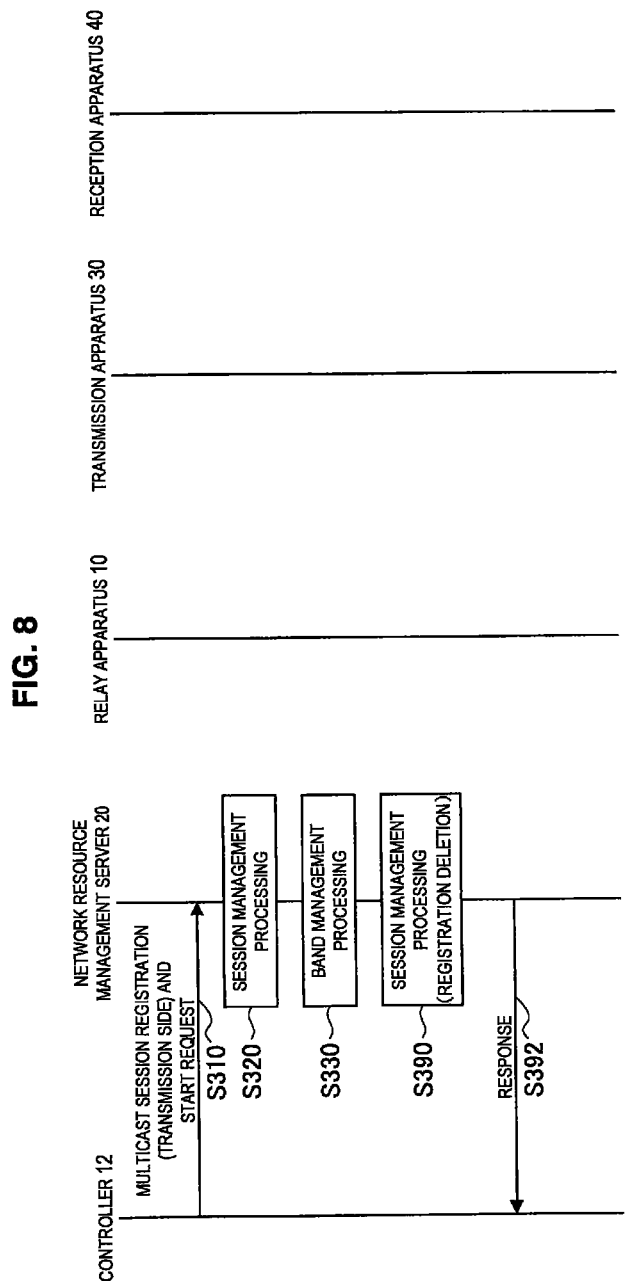
FIG. 8 is a sequence diagram illustrating an unsuccessful example of session registration on a transmission apparatus side.

FIG. 8 is a sequence diagram illustrating an unsuccessful example of the session registration on the side of the transmission apparatus 30. As illustrated in FIG. 8, when first the controller 12 transmits a request of the multi-session registration and start on the side of the transmission apparatus 30 to the network resource management server 20 (S310), the network resource management server 20 performs the session management processing (S320). After that, while the resource management unit 250 tries to perform the band management processing (S330), when above formula 1 is not satisfied and a band cannot be reserved, the session management unit 240 deletes the session information registered in S320 (S390). Then, the network resource management server 20 transmits a response indicating the unsuccessful session registration to the controller 12 (S392).

Figure 9:
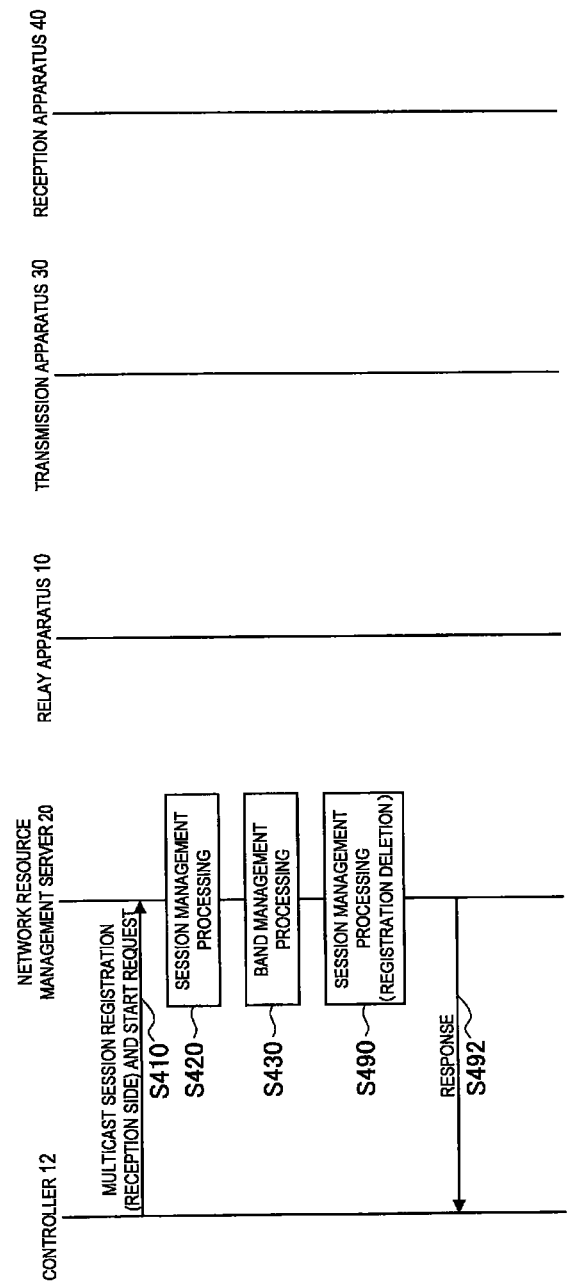
FIG. 9 is a sequence diagram illustrating an unsuccessful example of session registration on a reception apparatus side.

FIG. 9 is a sequence diagram illustrating an unsuccessful example of the session registration on the side of the reception apparatus 40. As illustrated in FIG. 9, when first the controller 12 transmits a request of the multi-session registration and start on the side of the reception apparatus 40 to the network resource management server 20 (S410), the network resource management server 20 performs the session management processing (S420). After that, while the resource management unit 250 tries to perform the band management processing (S430), when above formula 2 is not satisfied and a band cannot be reserved, the session management unit 240 deletes the session information registered in S420 (S490). Then, the network resource management server 20 transmits a response indicating the unsuccessful session registration to the controller 12 (S492).

(3-3. Operation in Registration Deletion)

Subsequently, operation of session registration deletion to be performed after the success of the session registration because of the change of the transmission apparatus 30 or the reception apparatus 40 will be explained.

Figure 10:
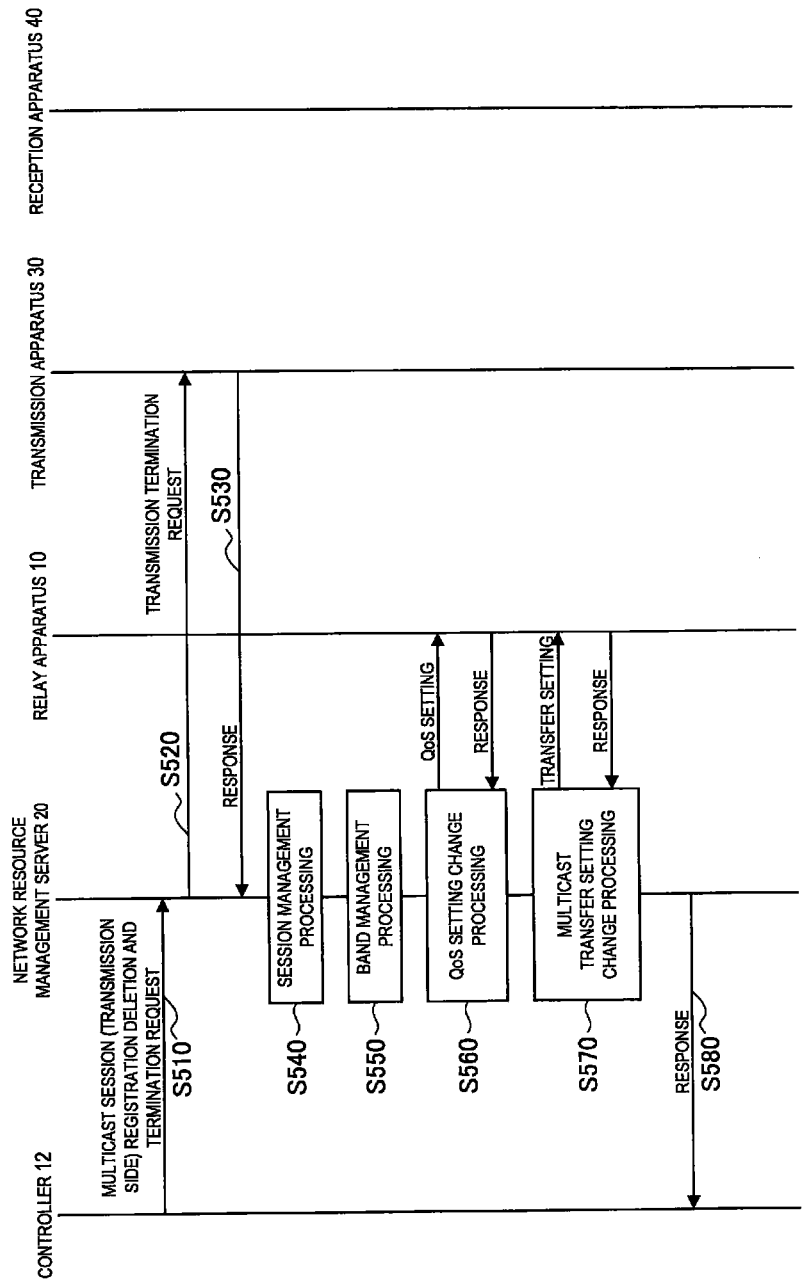
FIG. 10 is a sequence diagram illustrating operation in session registration deletion on a transmission apparatus side.

FIG. 10 is a sequence diagram illustrating the operation in the session registration deletion on the side of the transmission apparatus 30. As illustrated in FIG. 10, when first the controller 12 transmits a request of the multi-session registration deletion and termination on the side of the transmission apparatus 30 to the network resource management server 20 (S510), the network resource management server 20 transmits a transmission termination request to the transmission apparatus 30 to the transmission apparatus 30 (S520), and receives a response from the transmission apparatus 30 (S530).

After that, the session management unit 240 in the network resource management server 20 deletes the information about the transmission apparatus 30 from the session information as the session management processing (S540). Then, the resource management unit 250 releases the band reserved for each of the relay links on the side of the transmission apparatus 30 as the band management processing (S550). Subsequently, the transfer control unit 260 deletes the setting for the port of the relay apparatus 10 connected to the transmission apparatus 30 which is explained with reference to FIG. 4 as the Qos setting change processing (S340) (S560). Further, the transfer control unit 260 removes the transfer start setting for the relay apparatus 10 which is explained with reference to FIG. 4 as the multicast transfer setting change processing (S350) (S570). That is, the transfer control unit 260 performs transfer termination setting on the egress port of the relay apparatus 10 on the transmission side of the relay link. After that, the network resource management server 20 transmits a response indicating the termination of the session registration to the controller 12 (S580).

Figure 11:
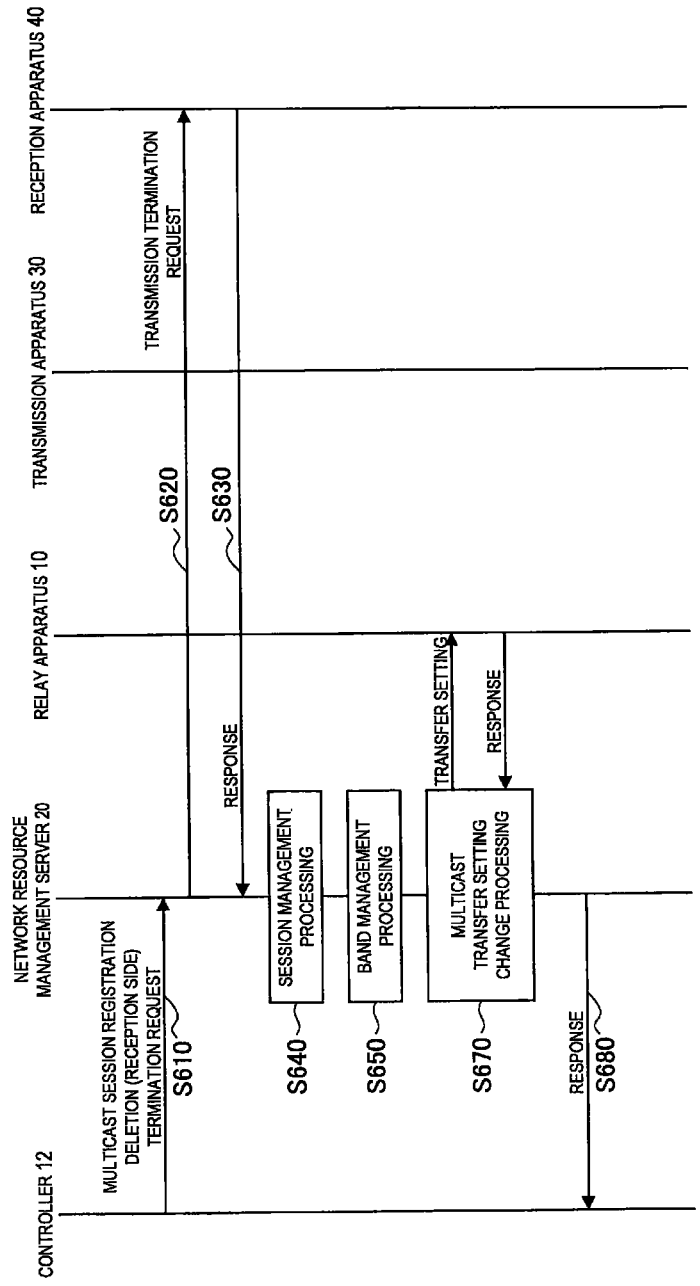
FIG. 11 is a sequence diagram illustrating operation in session registration deletion on a reception apparatus side.

FIG. 11 is a sequence diagram illustrating operation in session registration deletion on the side of the reception apparatus 40. As illustrated in FIG. 11, when first the controller 12 transmits a request of the multi-session registration deletion and termination on the side of the reception apparatus 40 to the network resource management server 20 (S610), the network resource management server 20 transmits a reception termination request to the reception apparatus 40 to the reception apparatus 40 (S620), and receives a response from the reception apparatus 40 (S630).

After that, the session management unit 240 of the network resource management server 20 deletes the information about the reception apparatus 40 from the session information, as the session management processing (S640). Then, the resource management unit 250 releases the band reserved for each of the relay links on the side of the reception apparatus 40, as the band management processing (S650). Further, the transfer control unit 260 removes the transfer start setting for the relay apparatus 10 which is explained with reference to FIG. 5 as the multicast transfer setting change processing (S450) (S670). That is, the transfer control unit 260 performs transfer termination setting on the egress port of the relay apparatus 10 on the transmission side of the relay link. After that, the network resource management server 20 transmits a response indicating the termination of the session registration to the controller 12 (S680).

As described above, according to the present embodiment, by performing the explicit transfer start setting and transfer termination setting, it is possible to reduce a time necessary for the change of valid/invalid setting in the multicast port transfer. Accordingly, it is possible to reduce a time necessary for display switching when reception and multicast transmission are switched in the reception apparatus 40, for example.

4. Variation Example

While FIG. 7 explains the band reservation in the simplified network configured with only the L2 switch 7, frequently the L2 switch 7 and the L3 switch 8 are mixed in an actual network. Accordingly, in the following, there will be explained a specific example of the band reservation in a network in which the L2 switch 7 and the L3 switch 8 are mixed.

Figure 12:
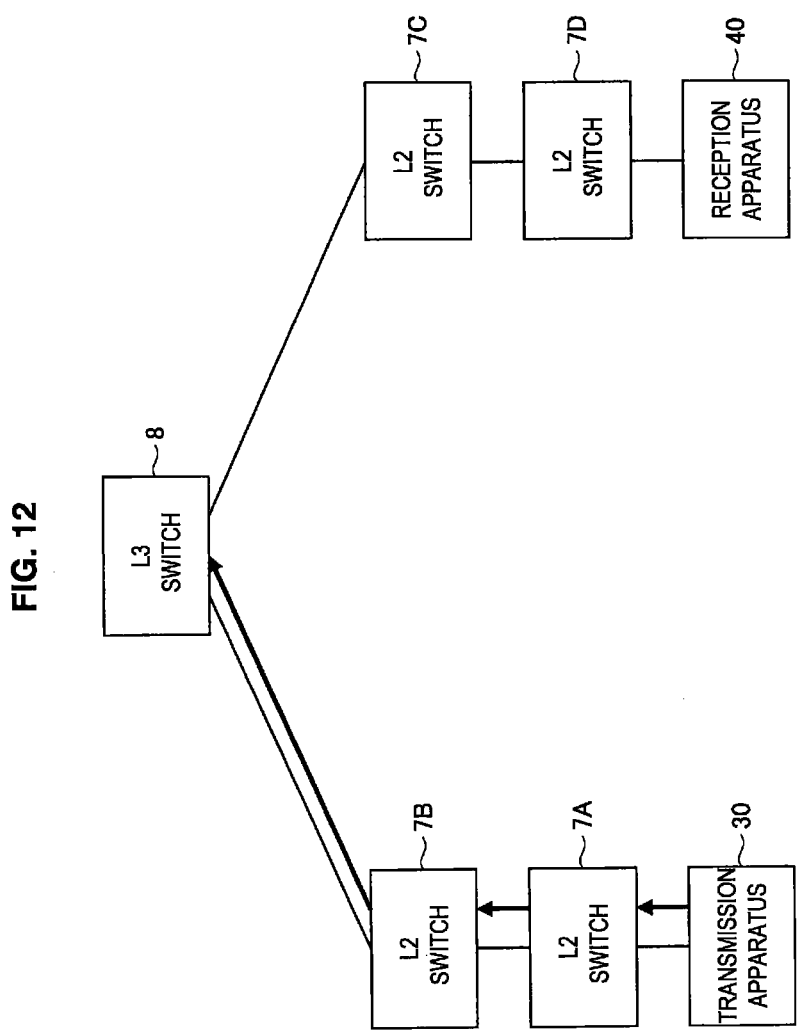
FIG. 12 is an explanatory diagram illustrating band reservation of a relay link on a transmission apparatus side.

FIG. 12 is an explanatory diagram illustrating the band reservation of a relay link on the side of the transmission apparatus 30. As illustrated in FIG. 12, when the band reservation on the side of the transmission apparatus 30 is performed in the network in which the L2 switches 7A to 7D and the L3 switch 8 exist between the transmission apparatus 30 and the reception apparatus 40, the resource management unit 250 performs the band reservation for each of the relay links from the transmission apparatus 30 to the L3 switch 8. That is, the resource management unit 250 performs the band reservation for the relay links from the transmission apparatus 30 to the L2 switch 7A, from the L2 switch 7A to the L2 switch 7B, and from the L2 switch 7B to the L3 switch 8. Then, the network resource management server 20 instructs the transmission apparatus 30 to start the transmission of a data stream, in synchronization with the band reservation.

Figure 13:
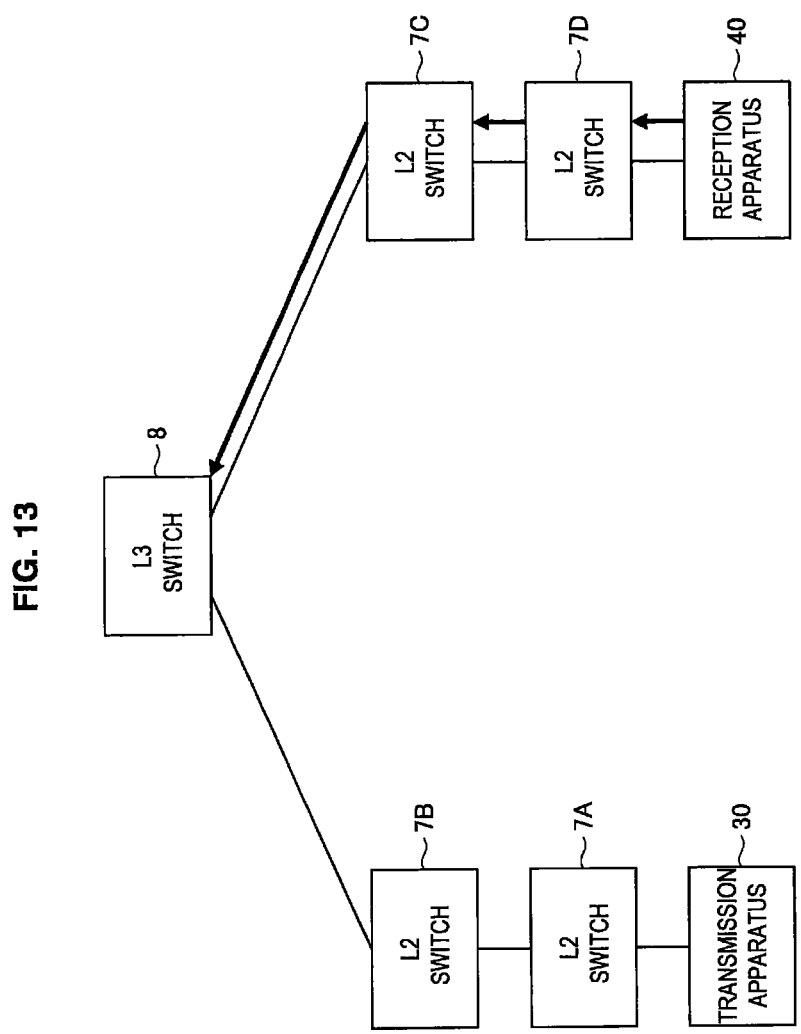
FIG. 13 is an explanatory diagram illustrating band reservation of a relay link on a reception apparatus side.

FIG. 13 is an explanatory diagram illustrating the band reservation of a relay link on the side of the reception apparatus 40. The resource management unit 250 performs the band reservation for each of the relay links from the reception apparatus 40 to the L3 switch 8, as the band reservation of the relay link on the side of the reception apparatus 40. Then, the network resource management server 20 notifies the controller 12 of the number of data streams which the reception apparatus 40 can receive from the transmission apparatus 30, and multicast traffic information from the transmission apparatus 30 received at the L3 switch 8.

Figure 14:
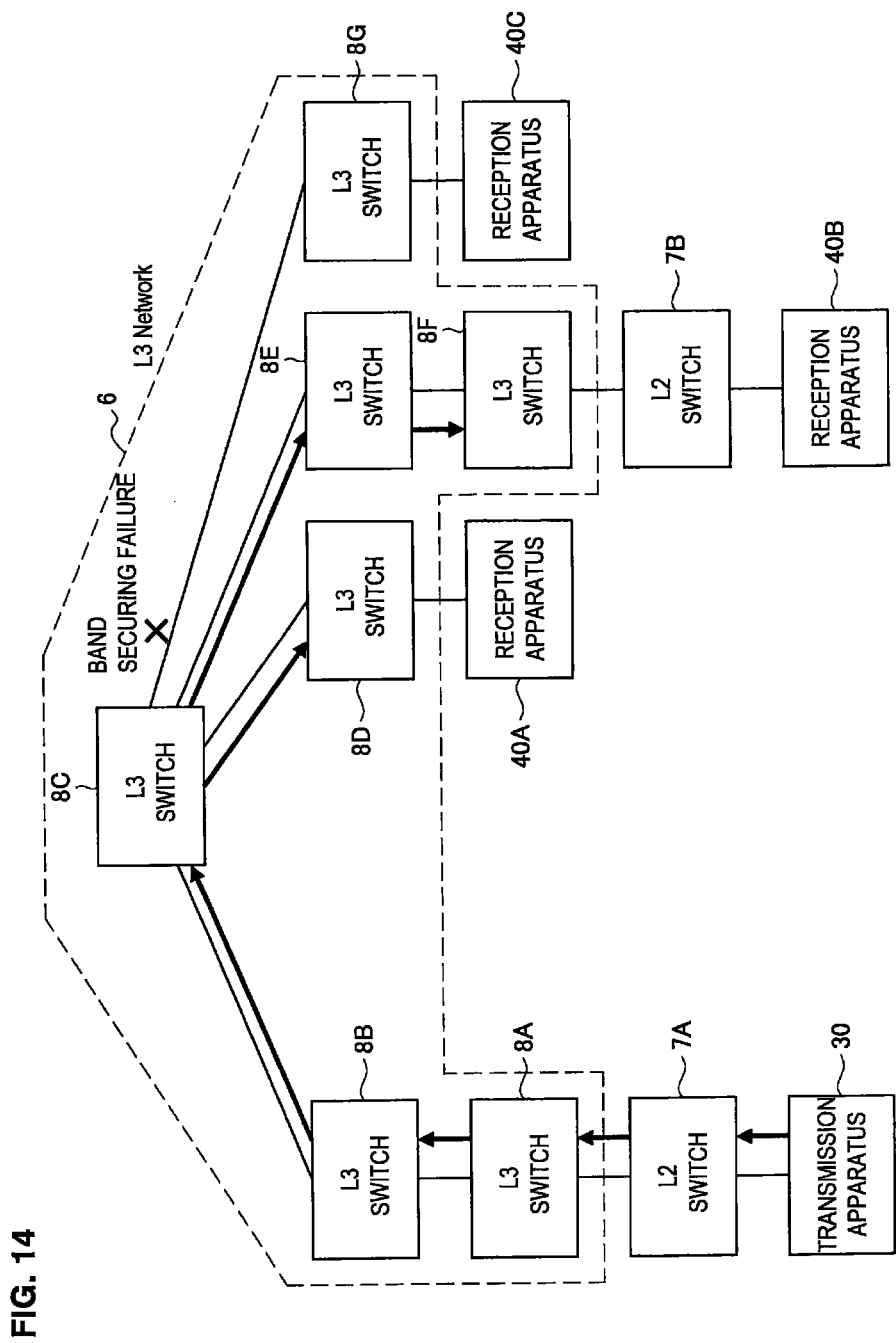
FIG. 14 is an explanatory diagram illustrating a variation example for band reservation of a relay link on a transmission apparatus side.

FIG. 14 is an explanatory diagram illustrating a variation example for the band reservation of a relay link on the side of the transmission apparatus 30. The resource management unit 250, when performing the band reservation on the side of the transmission apparatus 30, as illustrated in FIG. 14, may perform the band reservation for rely links up to the L3 switch 8 at the edge on the side where the reception apparatus 40 is connected. FIG. 14 shows an example of performing the band reservation of relay links from the transmission apparatus 30 to an L3 switch 8D, and relay links from the transmission apparatus 30 to an L3 switch 8F. Note that, for the band reservation of a relay link between an L3 switch 8C and an L3 switch 8G the band reservation fails because of band shortage or the like. Then, the network resource management server 20 instructs the transmission apparatus 30 to start transmission of the data stream, in synchronization with the band reservation. Note that the network resource management server 20 may secure a band of a relay link by the band reservation, and may perform transfer start setting for the L3 switch 8 in the stage where a reception apparatus 40 to participate the multicast transmission appears. With such a configuration, it is possible to suppress traffic within the L3 network.

5. Hardware Configuration

As above, the embodiment of the present disclosure has been explained. The above described information processing such as the resource management and the transfer setting change processing is realized by the cooperation of software and the hardware of the network resource management server 20 to be explained in the following.

Figure 15:
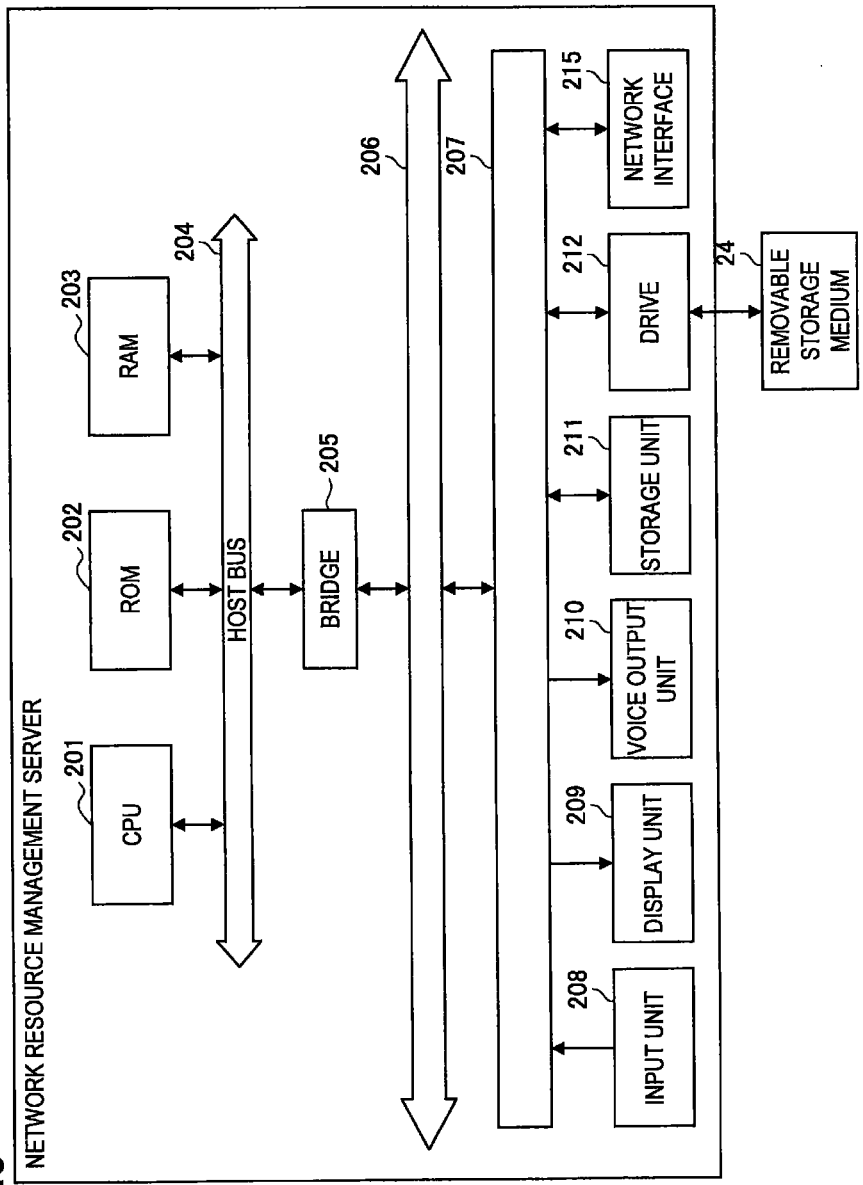
FIG. 15 is an explanatory diagram illustrating a hardware configuration of a network resource management server.

FIG. 15 is an explanatory diagram illustrating a hardware configuration of the network resource management server 20. As illustrated in FIG. 15, the network resource management server 20 includes a central processing unit (CPU) 201, a read only memory (ROM) 202, a random access memory (RAM) 203, an input unit 208, an output unit 210, a storage unit 211, a drive 212, and a communication unit 215.

The CPU 201 functions as an operation processing unit and a control unit, and controls the whole operation in the network resource management server 20 according to various kinds of program. For example, the functions of the channel collection unit 220, the session management unit 240, the resource management unit 250, and the transfer control unit 260 which are explained with reference to FIG. 3 are realized by the cooperation of this CPU 201 and the software. Further, the CPU 201 may be a microprocessor. The ROM 202 stores a program, an operation parameter, and the like to be used by the CPU 201. The RAM 203 temporarily stores a program used in execution by the CPU 201, a parameter which is changed as needed in the execution, and the like. These units are mutually connected by a host bus configured from a CPU bus or the like.

The input unit 208 is configured from input means for a user to input information such as a mouse, a keyboard, a touch panel, a button, a microphone, a switch, and a lever, an input control circuit to generate an input signal based on the user's input and to output the input signal to the CPU 201, and the like. The user of the network resource management server 20 can input various kinds of data and instruct processing operation for the network resource management server 20 by operating the input unit 208.

The output unit 210 includes a display unit such as a liquid crystal display (LCD) unit, an organic light emitting diode (OLED) unit, a lamp, and the like, for example. Further, the output unit 210 includes a voice output unit such as a speaker and a headphone. For example, the display unit displays a captured image, a generated image, or the like. On the other side, the voice output unit outputs voice data or the like which is converted into voice.

The storage unit 211 is a unit for data storage configured as an example of the storage unit of the network resource management server 20 according to the present embodiment. The storage unit 211 may include a storage medium, a recording unit to record data into the storage medium, a read unit to read data from the storage medium, a deletion unit to delete data recorded in the storage medium, and the like. This storage unit 211 stores a program to be executed by the CPU 201 and various kinds of data.

The drive 212 is a reader-writer for the recording medium, and is built in the network resource management server 20 or attached externally. The drive 212 reads information recorded in an attached removable storage medium 24 such as a magnetic disk, an optical disk, a magneto-optical disk, a semiconductor memory, and outputs the information to the RAM 203. Further, the drive 212 can write information into the removable storage medium 24.

The communication unit 215 is a communication interface configured from a communication device or the like for the connection to the L3 network, for example.

Note that, while, in the above, the hardware configuration of the network resource management server 20 is explained with reference to FIG. 15, the hardware of the controller 12, the transmission apparatus 30, the reception apparatus 40, and the like can be configured substantially in the same manner as the network resource management server 20, and explanation is omitted.

6. Conclusion

As explained above, according to the embodiment of the present disclosure, the session information on the side of the transmission apparatus 30 and the session information on the side of the reception apparatus 40 are registered and deleted separately. With such a configuration, it becomes possible to flexibly handle the change in the transmission apparatus or the reception apparatus which participates in the multicast transmission.

Further, as the multicast transfer setting change processing, the embodiment of the present disclosure, in the initial setting, sets the relay apparatus 10 on the network so as not to receive a request of participation to the multicast group, and, in the session registration, performs the transfer start setting of a data stream included in the registered session to the relay apparatus 10. With such a configuration, only the data stream in the session registration is transferred on the network as a data stream to be multicast-transmitted, and it is possible to realize the band management of the multicast transmission.

The preferred embodiment of the present disclosure has been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the steps in the processing of the network resource management server 20 of the present specification do not necessarily need to be processed in time series along the order described in the sequence diagram or the flowchart. For example, the steps in the processing of the network resource management server 20 may be processed in an order different from the order described in the sequence diagram, or may be processed in parallel.

Further, a computer program can be created to cause the hardware such as the CPU 201, the ROM 202, and the RAM 203 built in the network resource management server 20 to perform functions equivalent to the functions of the above described elements of the network resource management server 20. Further the storage medium storing the computer program is also provided.

Additionally, the present technology may also be configured as below.

(1)

A relay management apparatus including:

a session management unit configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

(2)

The relay management apparatus according to (1), further including:

a transfer control unit configured to set the relay apparatus into a limit mode in which reception of a request for participation to a multicast group from the one or two or more reception apparatuses is limited, and to perform transfer start setting of the data stream on a relay apparatus that forms a relay link for which the band reservation has been performed.

(3)

The relay management apparatus according to (2), wherein, when the session information on the transmission apparatus side or the session information on the reception apparatus side is deleted by the session management unit, the transfer control unit performs transfer termination setting of the data stream on a relay apparatus that forms a relay link on a side where the session information is deleted.

(4)

The relay management apparatus according to (2) or (3), wherein the transfer control unit sets limit of an output transmission rate for each data class to the relay apparatuses, and sets, as an input limit rate of a relay apparatus connected with a transmission apparatus for which session information has been registered by the session management unit, a data rate of the data stream included in the session information.

(5)

The relay management apparatus according to any one of (1) to (4), wherein the band reservation unit determines whether or not band reservation is possible, based on whether or not a total value of a data rate of multicast transmission that is already reserved to be used in a reservation target relay link and the data rate of the data stream exceeds an upper limit dada rate.

(6)

The relay management apparatus according to (5), wherein the upper limit data rate is a rate smaller than a maximum transmission rate of the reservation target relay link.

(7)

The relay management apparatus according to any one of (1) to (6), wherein the session management unit separately performs deletion of the registered session information on the transmission apparatus side and the registered session information on the reception apparatus side.

(8)

A relay management method including:

performing registration of session information for multicast transmission of a data stream that is performed between one or two or more transmission apparatuses and one or two or more reception apparatuses via relay links of a relay apparatus, separately for information on a transmission apparatus side and information on a reception apparatus side; and performing band reservation of a relay link on the transmission apparatus side or band reservation of a relay link on the reception apparatus side, based on the registration of the session information on the transmission apparatus side or the reception apparatus side.

(9)

A program causing a computer to function as:

a session management unit configured to perform registration of session information for multicast transmission of a data stream that is performed between one or two or more transmission apparatuses and one or two or more reception apparatuses via relay links of a relay apparatus, separately for information on a transmission apparatus side and information on a reception apparatus side; and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

(10)

A relay management system including:

one or two or more transmission apparatuses;

one or two or more reception apparatuses;

one or two or more relay apparatuses forming relay links between the one or two or more transmission apparatuses and the one or two or more reception apparatuses; and a relay management apparatus including, a session management unit configured to perform registration of session information for multicast transmission of a data stream that is performed via the relay links, separately for information on a transmission apparatus side and information on a reception apparatus side, and a band reservation unit configured to perform band reservation of a relay link on the transmission apparatus side or band reservation of a relay link on the reception apparatus side, based on the registration of the session information on the transmission apparatus side or the reception apparatus side performed by the session management unit.

REFERENCE SIGNS LIST

7 L2 switch
8 L3 switch
10 relay apparatus
12 controller
14 imaging apparatus
16 display apparatus
20 network resource management server
30 transmission apparatus
32 multicast transmission unit
40 reception apparatus
42 multicast reception unit
220 channel collection unit
230 database
240 session management unit
250 resource management unit
260 transfer control unit

The invention claimed is:

1. A relay management apparatus comprising a circuitry configured to:

perform session registrations for multicast transmission of a data stream that is to be performed between two or more transmission apparatuses and two or more reception apparatuses via relay links of a first relay apparatus, wherein the session registrations are performed separately for each of the two or more transmission apparatuses on a transmission apparatus side and each of the two or more reception apparatuses on a reception apparatus side; and perform band reservation of a relay link on the transmission apparatus side or band reservation of a relay link on the reception apparatus side, based on the session registrations on the transmission apparatus side or the reception apparatus side.

2. The relay management apparatus according to claim 1, wherein the circuitry is further configured to:

set the first relay apparatus into a limit mode in which reception of a request for participation to a multicast group from the two or more reception apparatuses is limited, and to perform transfer start setting of the data stream on a relay apparatus that forms a relay link for which the band reservation has been performed.

3. The relay management apparatus according to claim 2, wherein, when the session registrations on the transmission apparatus side or the session registrations on the reception apparatus side are deleted, the circuitry performs transfer termination setting of the data stream on a relay apparatus that forms a relay link on a side where the session information is deleted.

4. The relay management apparatus according to claim 2, wherein the circuitry sets an output limit rate for each data class to the first relay apparatus, and an input limit rate of a second relay apparatus connected with a transmission apparatus for which session information has been registered, wherein the output limit rate and input limit rate for the data stream are included in the session information.

5. The relay management apparatus according to claim 1, wherein the circuitry determines whether or not band reservation is possible, based on whether or not a total value of a data rate of multicast transmission that is already reserved to be used in a reservation target relay link exceeds an upper limit data rate.

6. The relay management apparatus according to claim 5, wherein the upper limit data rate is a rate smaller than a maximum transmission rate of the reservation target relay link.

7. The relay management apparatus according to claim 1, wherein the circuitry separately performs deletion of the registered session information on the transmission apparatus side and the registered session information on the reception apparatus side.

8. A relay management method comprising:
performing session registrations for multicast transmission of a data stream that is performed between two or more transmission apparatuses and two or more reception apparatuses via relay links of a relay apparatus, wherein the session registrations are performed separately for each of the two or more transmission apparatuses on a transmission apparatus side and each of the two or more reception apparatuses on a reception apparatus side; and
performing band reservation of a relay link on the transmission apparatus side or band reservation of a relay link on the reception apparatus side, based on the session registrations-on the transmission apparatus side or the reception apparatus side.

9. A non-transitory computer readable medium having a program instructions which, when executed by a processor, cause the processor to:
perform session registrations for multicast transmission of a data stream that is performed between two or more transmission apparatuses and two or more reception apparatuses via relay links of a relay apparatus, wherein the session registrations are performed separately for each of the two or more transmission apparatuses on a transmission apparatus side and each of the two or more reception apparatuses on a reception apparatus side; and
perform band reservation of a relay link on the transmission apparatus side or band reservation of a relay link on the reception apparatus side, based on the session registrations on the transmission apparatus side or the reception apparatus side.

10. A relay management system comprising:
two or more transmission apparatuses;
two or more reception apparatuses;
at least one relay apparatus forming relay links between the two or more transmission apparatuses and the two or more reception apparatuses; and
a relay management apparatus including a circuitry configured to:
perform session registrations for multicast transmission of a data stream that is performed via the relay links, wherein the session registrations are performed separately for each of the two or more transmission apparatuses on a transmission apparatus side and each of the two or more reception apparatuses on a reception apparatus side, and
perform band reservation of a relay link on the transmission apparatus side or band reservation of a relay link on the reception apparatus side, based on the session registrations on the transmission apparatus side or the reception apparatus side.

\* \* \* \* \*